US008737515B2

(12) United States Patent
Ruland (10) Patent No.: US 8,737,515 B2
(45) Date of Patent: May 27, 2014

(54) METHOD FOR DETERMINING THE SPATIAL POSITION OF AN OBJECT, ELECTRONIC CIRCUIT AND ELECTRONIC SYSTEM

(71) Applicant: Christoph Ruland, Siegen (DE)

(72) Inventor: Christoph Ruland, Siegen (DE)

(*) Notice: Subject to any disclaimer, the term of this patent is extended or adjusted under 35 U.S.C. 154(b) by 0 days.

(21) Appl. No.: 13/714,733

(22) Filed: Dec. 14, 2012

(65) Prior Publication Data

US 2013/0259150 A1 Oct. 3, 2013

(30) Foreign Application Priority Data

Dec. 16, 2011 (DE) .......................... 10 2011 088 827

(51) Int. Cl.
*H04B 7/02* (2006.01)

(52) U.S. Cl.
USPC ........... 375/267; 375/130; 375/141; 375/145; 375/146; 375/147; 375/149; 375/316; 375/342; 375/347; 455/456.1; 463/1

(58) Field of Classification Search
USPC ......... 375/130, 141, 145, 146, 147, 149, 267, 375/316, 342, 347; 455/456.1; 463/1
See application file for complete search history.

(56) References Cited

U.S. PATENT DOCUMENTS

| 5,604,765 | A | 2/1997 | Bruno et al. |
| 5,995,043 | A | 11/1999 | Murphy |
| 6,697,629 | B1 | 2/2004 | Grilli et al. |
| 7,457,349 | B2 | 11/2008 | Grilli et al. |

(Continued)

FOREIGN PATENT DOCUMENTS

| DE | 60121211 T2 | 5/2007 |
| DE | 60121211 T2 | 5/2007 |
| DE | 60319709 T2 | 4/2009 |
| DE | 60319709 T2 | 4/2009 |

OTHER PUBLICATIONS

Z. Biacs, et al; The Qualcomm/Snaptrack Wireless Assisted GPS Hybrid Positioning System and Results From Initial Commercial Deployments; 1999.

(Continued)

*Primary Examiner* — Leon Flores
(74) *Attorney, Agent, or Firm* — Fleit Gibbons Gutman Bongini & Bianco PL; Martin Fleit; Paul D. Bianco (57) ABSTRACT

A roulette table, including an electronic system having at least one electronic circuit, a number of M antennas, a Code Division Multiple Access (CDMA) transmitter for sending a number of M orthogonal code sequences via the antennas, and a contactless communication interface for receiving the position from an electronic memory of the electronic circuit, in which the antennas are arranged below stake fields of the roulette table, and having chips, in which each chip is equipped with an electronic circuit. The electronic circuit includes the following: a CDMA receiver for receiving a number of M orthogonal code sequences; an electronic memory for storing an allocation instruction, through the allocation instruction each code sequence is assigned to one of the antennas, with this allocation containing information regarding the spatial location of the respective antenna; a processor for accessing the electronic memory to determine the position of the electronic circuit relative to the antennas by determining, with the help of the code sequences received from the CDMA receiver, the information regarding the spatial locations of those antennas by which the code sequences were received, and by deriving from the detected spatial locations of the antennas the position of the electronic circuit and producing a position signal therefrom; and a contactless communication interface for transmitting the position signal.

6 Claims, 10 Drawing Sheets

(56) References Cited

U.S. PATENT DOCUMENTS

| | | |
|---|---|---|
| 7,965,762 B2 | 6/2011 | Grilli et al. |
| 2003/0125045 A1 | 7/2003 | Riley et al. |
| 2004/0120386 A1 | 6/2004 | Grilli et al. |
| 2006/0076401 A1 | 4/2006 | Frerking |
| 2006/0166681 A1 | 7/2006 | Lohbihler |
| 2009/0067477 A1 | 3/2009 | Grilli et al. |
| 2009/0093293 A1 | 4/2009 | Koyama et al. |
| 2010/0234044 A1 | 9/2010 | Lohbihler |

OTHER PUBLICATIONS

Scrabble—DAS Intelligente Brettspiel; Institut Zuverlassigkeit Und Mikrointegration; Berlin, Nov. 2011.

Z. Biacs, G. Marshall, M. Moeglein, W. Riley, "The Qualcomm/Snap Track Wireless-Assisted GPS Hybrid Positioning System and Results from Initial Commercial Deployments", Sep. 2002.

"eScrabble—the intelligent board game" Fraunhofer Institute for Reliability and Micro-integration (IZM) (retreived from http://www.apz.izm.fraunhofer.de/bau/picture/upload/1_Scrabble_D.pdf on Dec. 12, 2012).

Office Action dated Jun. 8, 2012 for German Application No. 10 2011 088 827.6.

Figur 12

METHOD FOR DETERMINING THE SPATIAL POSITION OF AN OBJECT, ELECTRONIC CIRCUIT AND ELECTRONIC SYSTEM

CROSS REFERENCE TO RELATED APPLICATION

This application claims the priority of German Patent Application: DE 10 2011 088 827.6 filed on Dec. 16, 2011.

FIELD OF THE INVENTION

The present invention relates to a method for determining the spatial position of an object, an electronic circuit and an electronic system.

BACKGROUND OF THE INVENTION

From U.S. Pat. No. 5,604,765, a cellular mobile wireless system is known in which a navigation signal is transmitted with the help of a CDMA carrier.

From U.S. Pat. No. 5,995,043, a satellite-supported airplane precision navigation system is known in which a base station collects GPS signals from which it calculates corrective information that is sent to an airplane with the help of a CDMA data link.

From "The Qualcomm/SnapTrack Wireless-Assisted GPS Hybrid Positioning System and Results from Initial Commercial Deployments", Z. Biacs, G. Marshall, M. Moeglein, W. Riley, a CDMA-based wireless network is known in which position information that was obtained through GPS is transmitted via CDMA.

From "eScrabble—the intelligent board game" Fraunhofer Institute for Reliability and Micro-integration (IZM) (http://www.apz.izm.fraunhofer.de/bau/picture/upload/1_Scrabble_D.pdf) a conductor plate that has been laminated with game board foil is known. The wireless transmittal of information in order to identify player/s, letters and letter values occurs per RFID at a frequency of 13.56 MHz, while the communication between game board, game racks and laptop takes place via a 2.4 GHz wireless interface, see also "RFID exact location read-out", *productronic* 10, 2008, page 58.

In all of the aforementioned papers, the CDMA sequence is used as carrier, in order to transmit data containing position information that were modulated onto the carrier signal. The underlying task of the invention, however, is to create an improved method for determining the spatial position of an object, in addition to a corresponding electronic circuit and an appropriate electronic system, especially in order to realize a parlor game, such as a roulette table or a board game, a navigation system or an automation system.

BRIEF DESCRIPTION OF THE INVENTION

Each of the tasks that underlie the invention is solved with the characteristics of the independent patent claims. Embodiments of the invention are described in the dependent patent claims.

According to embodiments of the invention, a number of M orthogonal code sequences is sent with the help of CDMA via a number of at least M antennas, especially simultaneously. Herein, each of the orthogonal code sequences is assigned to one of the M antennas and is emitted exclusively over the antenna that has been assigned to the code sequence. The antennas are distributed in a spatial area. The number M of the antennas may be chosen depending on the number and the exactitude of the object positions to be recognized within the range of the antennas.

The object comprises a CDMA receiver that is equipped to receive simultaneously each of the M code sequences. In other words, the CDMA receiver receives the summary signal of different antennas in whose range it is located and checks subsequently which of the antennas received one of the orthogonal code sequences. The CDMA receiver contains an allocation instruction, such as an allocation table, in which an identifier has been unequivocally assigned to each of the M orthogonal code sequences. The CDMA receiver accesses this allocation instruction in order to determine the identifiers of the code sequences that were received. The CDMA receiver then stores these identifiers in an electronic memory of the object. From this electronic memory, the identifiers then are read out via a contactless interface, such as a wireless interface, especially an RDIF, NFC or Bluetooth interface or via an optical interface.

Due to the identifiers, the spatial position of the object relative to the M antennas then can be derived, since each of the identifiers is assigned to one of the code sequences and thus one of the antennas.

According to an alternative embodiment of the invention, the detection of the spatial position takes place through the CDMA receiver of the object due to an allocation instruction that allocates directly to each of the code sequences a spatial position of one of the antennas, namely the antenna to which the respective code sequence is assigned and through which the respective code sequence is sent. In this case, the object does not send the identifiers, but rather the already determined spatial position.

Embodiments of the invention are particularly advantageous since only the code sequences are sent via the antennas without having to transmit additional user information via the code sequences. Thus, only a CDMA carrier in the form of the code sequences is sent without superimposing user information onto the code sequences. The receipt of the code sequences, too, and the further data processing in order to determine the position can be implemented with correspondingly little effort.

To this end, it is only necessary to determine with the help of an allocation instruction that have been receiving code sequences those antennas and/or their spatial positions. The spatial position of the object is then readily derived from the thus found antennas and/or their already-known spatial positions.

Embodiments of the invention are therefore particularly advantageous since the position of an object may be determined with little technical effort and a correspondingly short latency period. Thus, embodiments of the invention are particularly well-suited for the determination of the spatial position of game pieces, especially of parlor games, and preferably of board games or games of chance, especially roulette.

According to an embodiment of the invention, the contactless communication interface of the object is a wireless interface, especially in the radio frequency range, such as an RFID, NFC or Bluetooth interface. Alternatively, or additionally, the contactless communication interface of the object may be designed as an optical interface, e.g. through an infrared transmitter.

According to an embodiment, the antennas form a two-dimensional or a three-dimensional coordinate system, such as a Cartesian coordinate system. In such a case, the antennas preferably are arranged in parallel to one of the coordinates' axes. In the case of a two-dimensional coordinate system this means that the antennas are arranged either parallel to the x-axis or to the y-axis. Thus, the spatial location of each of the antennas then may be described through a single value, namely its x or y coordinate, respectively.

According to an embodiment of the invention, each object has its own energy supply, such as a primary or a secondary battery. It is, however, particularly advantageous if the energy is supplied via the antennas, through e.g. the inductive insertion of electrical energy. For this purpose, the antennas may be used though which the orthogonal code sequences are sent out. If the communication interface is designed as a wireless interface, especially as an RFID or NFC interface, one or more additional antennas may be arranged e.g. in the roulette table or on the game board, in order to communicate with the object's communication interface via transceiver. Through these additional antennas, alternatively or additionally, the insertion of the electrical energy into the objects may take place.

Especially, one may choose the following: during a location-finding phase initially the code sequences are sent that then are received by the object and evaluated by determining the identifiers and/or the spatial position of the object. The electrical energy required for the operation of the object during this location-finding phase may be derived inductively via the antennas through which the code sequences are sent and/or through the antenna that serves the purpose of communicating with the wireless communication interface.

According to an embodiment of the invention, there will be a read-out phase, in addition to the location-finding phase during which the CDMA-based emission of the code sequences takes place. In this case, the location-finding phase and the read-out phase may occur sequentially, meaning that the location-finding phase is followed by the read-out phase.

For the emission of the CDMA code sequences and the read-out of the identifiers and/or the position, depending on the type of embodiment, either the same antenna system or two separate antenna systems may be used, of which one is used for sending and the other for reading the code sequences.

According to another embodiment of the invention, the location-finding phase and the read-out phase may occur in parallel to each other, especially with the utilization of one antenna system each for the location-finding phase and for the read-out phase. In particular, the location-finding phase and the read-out phase may occur a-synchronically to each other. This is particularly advantageous in the case of rapidly moving objects where the location-finding must occur continuously, such as with flying objects. Here, in particular, both the location-finding phase and the read-out phase may occur cyclically, meaning that the emission of the CDMA code sequences takes place repetitively in fixed and variable time intervals, or continuously, in addition to the reading-out of the identifiers and/or the position.

According to an embodiment of the invention, the read-out phase is followed by another phase, during which a signal is sent to the object as the result of the read-out phase. For example, the data that were read during the read-out phase, such as identifiers or the position, are processed by an electronic system in accordance with the invention, such as by the electronic circuit in accordance with the invention. As the result of this data processing, the signal is produced subsequently which is sent by the electronic system to the object. Hereby the antenna system that is used to send the CDMA code sequences and/or the antenna system that is used for the read-out, may be used as return channel. The signal may be a steering signal, a regulation signal, a reaction signal, a navigation signal or a data transfer signal, in order to e.g. steer a movement or an action of the object.

According to an embodiment of the invention, the energy supply for the objects takes place passively, meaning e.g. via an inductive insertion via the antenna system/s or an additional inductive field. Alternatively, the energy supply may take place semi-passively, meaning via a primary battery, a secondary battery (accumulator) or a condenser as a buffer for the energy that is added, or actively via a separate energy supply device, such as a solar cell or a drive device of the object.

According to embodiments of the invention, the object sends a signal after having received and evaluated one or several of the code sequences via CDMA. For example, the object sends a signal in order to transmit the identifiers and/or or the position that were determined by the object due to the code sequences received. From the identifiers and/or its detected position, however, the object may also with the help of data processing steps derive an additional signal, such as a steering command, a warning signal, fee information, a start or a stop command or other information that is sent by the object.

In another aspect, the invention relates to an appropriately corresponding electronic circuit. The electronic circuit may be designed such that from the code sequences that were received only the respective identifiers are recognized and stored in order to subsequently be displayed via the contactless interface. Alternatively, the electronic circuit may be designed such that from the code sequences received already the position of the object can be derived and displayed via the contactless communication interface.

According to embodiments of the invention, the electronic circuit is designed as a so-called wireless tag, i.e. as RFID tag or NFC tag. In particular, an electronic circuit may be designed as a semi-conductor chip and may be integrated into the object. According to further embodiments of the invention, the electronic circuit may be placed either completely or partially upon the object with the help of printing techniques; in particular, the electronic circuit may be realized either completely or partially polymer-electronically and/or with the help of conductible ink.

In another aspect, the invention relates to an electronic system having one or several objects, each of which have an electronic circuit in accordance with the invention, in addition to M antennas that help send the orthogonal code sequences via CDMA and with a contactless interface in order to access the corresponding contact interface/s of the object/s in order to read out the identifiers and/or the position.

According to an embodiment of the invention, the antennas that extend in the same coordinate direction, are arranged equidistantly and have e.g. a distance of A. The range of an antenna then should be at least A/2 in order to enable the unequivocal allocation of the object to one of the antennas. Preferably, the range of each of the antennas is less than A, especially maximally 3/4 A.

According to an embodiment of the invention, the electronic system has several groups of M antennas, wherein the same orthogonal code sequences are sent via the antennas of each of these groups. Herein, the transmission range of each of the antennas is preferably chosen such that it does not interfere with the range of the respective antenna of another group. In particular, it is advantageous when the adjacent antennas of different groups have been assigned to different code sequences. In this case, the spatial location of the groups is indicated in the allocation instruction.

According to an embodiment of the invention, the electrical system contains a network interface. The latter enables the electrical system to transmit the detected spatial position of an electrical circuit to an external device. The external device may e.g. be one or several additional electronic systems in accordance with the invention, or also a computer or a network comprising electronic systems and/or computers. In order to be able to transmit positional data of an electrical circuit, the processor media are adjusted to be able to transform the positional data into machine-readable information that is summarized in one message. Furthermore, the processor media are adjusted so that they are able to send such a message via the network interface.

Thus, according to an embodiment of the invention, the processor means of the electronic system have been adjusted in order to enable them to receive messages via a network interface and to evaluate the content of this message. Thereby it is possible that two or more electronic systems in accordance with the invention inform each other of the detected positions of electrical control devices within their control area, i.e. the area that is covered by their antenna raster. Hereby it is possible that, in addition to the position information, other information regarding the electronic circuit is contained in a message. For example, thus an additional attribute of the electronic circuit may be transmitted. In the event that the electronic circuit is a chip or a game piece, for example, this could be the value of the chip or the type and characteristics of the game piece. Moreover, it is also possible that the electronic systems in accordance with the invention, may exchange messages containing information that does not bear a direct relationship to the electronic circuits. Again, in the case of the invention being utilized in connection with a game, such information could be the score of the game. According to an embodiment of the invention, the electronic system is additionally equipped with the means to indicate the content of a received message. Using again the example of applying the invention to a game, such as chess, the electronic systems of the participants may tell each other which move was performed by the other player. Upon receiving a message with corresponding content, the content is being evaluated by the processor means of the electronic system. The display means may now consist of the fields of the chessboard being equipped with illuminants. For example, the move of an opponent could be announced by illuminating the field on which the participating game piece is located, and, moreover, lighting up the spaces that are passed by the game piece during its move. In particular, the display means may be designed such that, depending on the type of utilization of the electronic system, the area that is circumscribed by the antenna raster, is covered e.g. through an e-paper or an extremely thin and/or foldable display which may display different surfaces, according to each type of application. Using again the example of a game, different game plans may be displayed on the e-paper or on the display.

In a further aspect, the invention relates to a system that comprises at least two electronic systems in accordance with the above embodiments, in addition to at least one computer. Hereby, the electronic systems are capable of mutually exchanging messages via a defined communication channel, such as the Internet or a local network. The computer is herein connected to the communication channel. The computer is adjusted in order to receive messages from the electronic systems or to send messages to them.

Moreover, the computer is able to read out and process the information that is contained in the messages. Thus, the computer may e.g. check on the basis of the data that reflect the positions of electronic circuits in the control area of the electronic systems, whether the distribution of the electronic circuits in both control areas is the same. Furthermore, the computer may also add information to a message. In cases of the invention being utilized in connection with a board game, the computer may check game scores, point counts or other similar information and/or review the course of the game for rule violations, with the help of the position data of the game pieces that were obtained (represented by electronic circuits). The computer may add the findings to the messages, enabling them to be displayed to the users through the electronic systems. If several computers are included in the system, they, too, are adjusted in order to be able to exchange information with each other.

Additionally, it is possible that the computer will indicate the information or the findings obtained that are based on the information that was received, e.g. via a display. The computer may be a network server, a stationary PC, a laptop, a tablet PC or a Smartphone.

According to an embodiment of the invention, the communication channel is a social network, such as Facebook, MySpace or Google+.

In another aspect, the invention relates to a parlor game with game tiles, especially game pieces or chips, and with an electronic system for the automatic detection of the game pieces' position. In addition to the position information, for each game piece at least one additional attribute may be stored, such as its value, which also can be read out via the contactless interface, especially an amount, a letter, a number or another symbol or a sequence or sequences thereof.

According to an embodiment of the invention, the M antennas and, if applicable, the antenna for the communication with the contactless interface of the object, are arranged in a roulette table. Each of the chips of the roulette game has an electronic circuit in accordance with the invention for the detection of the chip's position on the roulette table, i.e. the position of each chip relative to the stake areas. Moreover, the value of a chip can be read out via a wireless communication interface.

In board games, however, the antennas may be arranged in or on top of the game board. In the case of a Scrabble game, for instance, in addition to the position of the individual game tiles, the letters represented by each tile, may be read via RFID, in order to record and evaluate the course of the game electronically. In particular, each player's point score can be detected and displayed automatically in this manner.

In an additional aspect, the invention relates to an automation system with a robot and a steering device for the robot. The robot is used to handle at least one object that is equipped with an electronic circuit in accordance with the invention. The automation system comprises an electronic system in accordance with the invention in order to detect the position of the object and to input the position into the robot's steering device. Subsequently, the robot is triggered correspondingly in order to e.g. grasp the object.

BRIEF DESCRIPTION OF THE FIGURES

Below follows a more detailed description of the invention's embodiments as they relate to the various figures. The figures show as follows.

DETAILED DESCRIPTION

In the following embodiments, elements that correspond to each other or that are identical with each other, are marked with the same reference signs.

Figure 1:
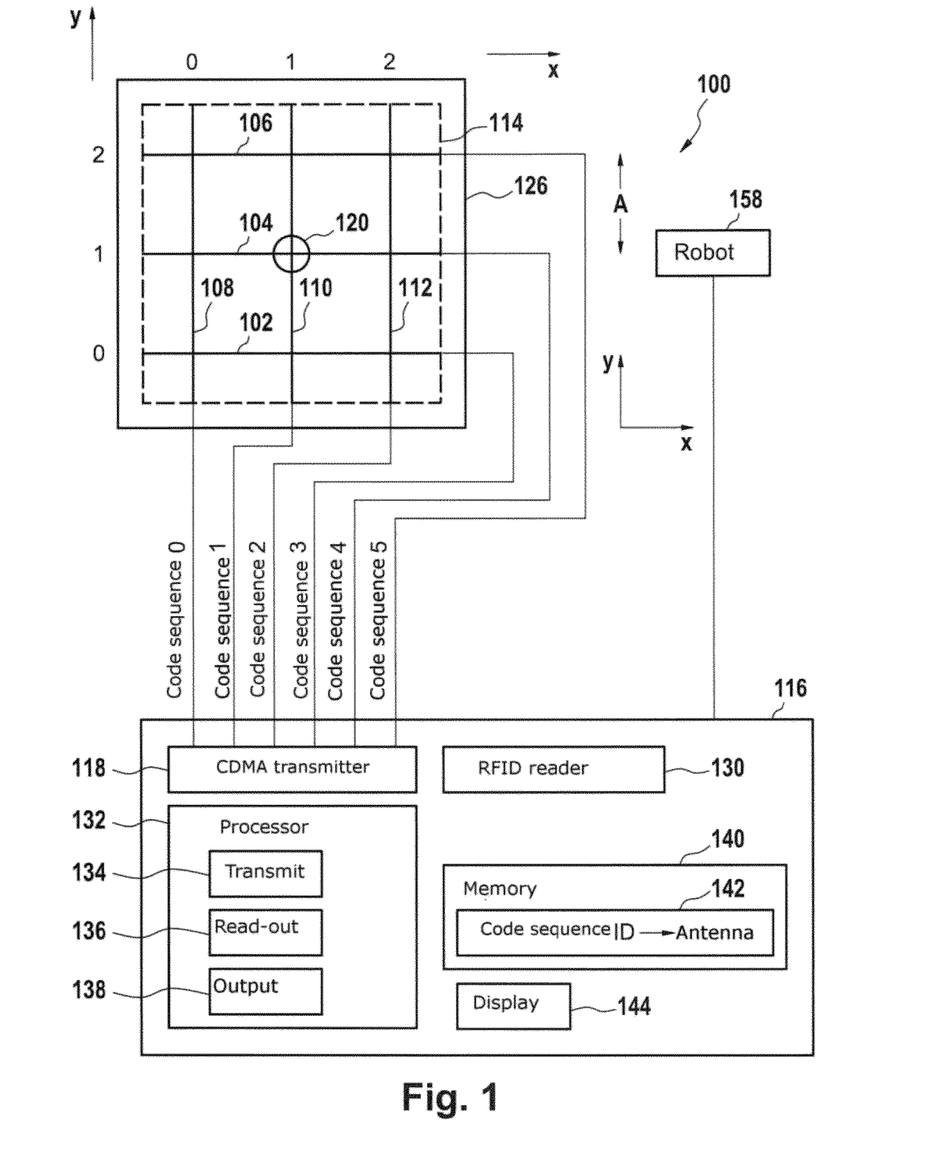
FIG. 1 A block diagram of an embodiment of an electronic system according to the invention FIG. 2 A block diagram of an embodiment of an object with an embodiment of an electronic circuit according to the invention FIG. 3 A flow diagram of an embodiment of the invention FIG. 4 The intersecting area of two antennas that are dipole antennas FIG. 5 The overlapping of the codes in the intersecting area of the antennas, according to FIG. 3

FIG. 1 shows an embodiment of an electronic system 100 in accordance with the invention. The electronic system 100 comprises a number of M antennas, in which M here equals 6. The antennas are here designed as dipole antennas and define through their position a system of coordinates, viz. a Cartesian coordinate system. The antennas 102, 104 and 106 run in the direction X, parallel to the y coordinates y=0, y=1 and y=2. On the other hand, the antennas 108, 110 and 112 run parallel to the y axis, along the x coordinates x=0, x=1 and x=2.

The antennas are extended in a spatial area 114. This spatial area 114 may e.g. be a game field, especially a stake area of a roulette table, the game board of a parlor game or a storage area for receiving goods, e.g. a storage container, a pallet or similar. Moreover, the spatial area 114 may also be the area of a building or a terrain. To each of the antennas 102 through 112 an orthogonal code sequence has been unequivocally assigned. In particular, the code sequence 0 is unequivocally assigned to the antenna 108 (x=0), the code sequence 1 is unequivocally assigned to the antenna 110 (x=1), the code sequence 2 is unequivocally assigned to antenna 112 (y=0), the code sequence 3 is unequivocally assigned to antenna 102 (y=0) the code sequence 4 and to the antenna 104 (y=1) and the code sequence 5 is unequivocally assigned to antenna 106 (y=2).

Code sequences that are orthogonal to each other are known per se from prior art; in particular, Walsh functions of the $M^{th}$ order may be applied here (In this context, see "Nachrichtenübertragung", K. D. Kammeyer, Teubner, 1996, 2nd Edition, P. 640).

The electronic system 100 comprises an electronic device 116 with a Code Division Multiple Access (CDMA) transmitter 118 that is connected with the antennas 102-112. The CDMA transmitter 118 serves to send out the M code sequences during a location-finding phase, preferably simultaneously, through the antennas 102 through 112. Preferably, the CDMA transmitter 18 sends the code sequences exclusively through the antennas that are assigned to the corresponding code sequences, meaning that no additional user information other than the code sequences are transmitted; thus, the code sequences do not serve as carrier signal but, rather, are the information itself that is to be transmitted.

However, the CDMA transmitter may be designed for the transmittal of additional signals that may be advantageous for the transmittal of the CDMA code sequences, especially signals for the transmission coding and the signal modulation. According to an embodiment of the invention, the emission of the code sequences takes place via an RFID carrier.

Figure 2:
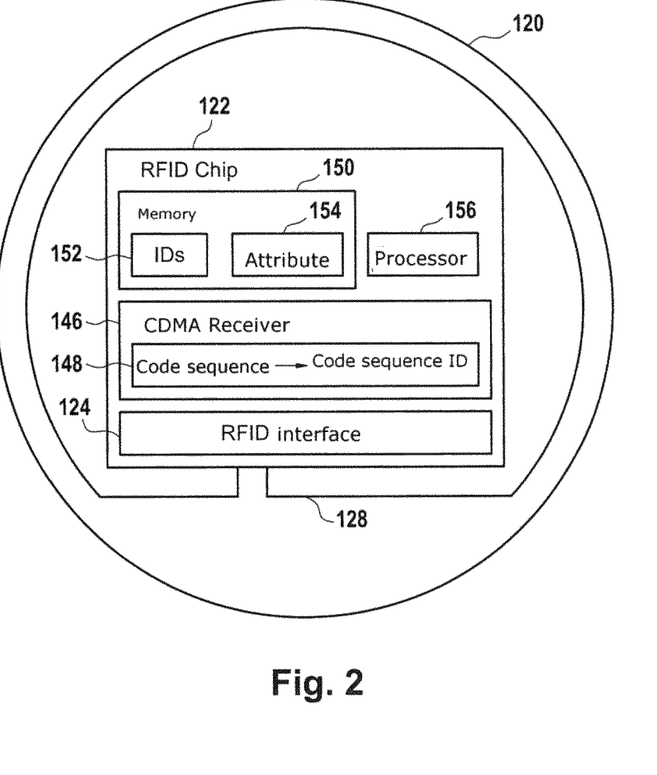

An electronic system 100 comprises at least one object 120, e.g. with an electronic circuit 122 (See FIG. 2). The electronic circuit 122 has a contactless interface 124, such as an RFID interface; in particular, the electronic circuit 122 may be an RFID chip.

For the communication with the contactless interface 124, there may be another antenna present, such as is depicted in FIG. 1. For example, the additional antenna may be one or several antenna spirals that are located in the area 114, in order to thusly establish via an electromagnetic coupling with the contactless interface 124 a communication channel, as e.g. according to an RFID or an NFC method.

Preferably, the supply of energy of the electronic circuit 122 may take place via the additional antenna, viz. by way of inductive coupling.

The additional antenna may be connected to an RFID reader 130 of the electronic device 116.

In the embodiment herein considered, the RFID reader 130 is connected to the antennas 102 through 112. After the CDMA transmitter 118 has sent the code sequences, the RFID reader 130 reads out the identifier/s and/or the position or another signal from the object 120 by triggering the same antennas 102 through 112.

The electronic system 100 comprises at least one microprocessor 132 in order to implement the program modules 134, 136 and 138. Moreover, the electronic device 116 has an electronic memory 140 for the storage of the allocation instruction, which allocates to each of the identifiers of the code sequences 0-5 one of the antennas and/or one of the antenna coordinates, respectively. For example, the allocation instruction may be an allocation table 142 that is stored in the memory 140. In the herein contemplated embodiment, the allocation table has the following content:

| Identifier of the code sequence | Antenna coordinate |
|---|---|
| 0 | x = 0 |
| 1 | x = 1 |
| 2 | x = 2 |
| 3 | x = 3 |
| 4 | x = 4 |
| 5 | x = 5 |

The electronic device 116 may also comprise a user interface, such as a display 144.

While in operation, first the program module 134 is executed during a location-finding phase. By executing program module 134, the CDMA transmitter 118 is triggered so that the code sequences with the identifiers 0-5 are sent out via the corresponding antennas 102-112. Subsequently, the object 120 receives with the help of its electronic circuit the code sequences of the antennas in whose range it is located.

When, for example, the antennas that extend in the same coordinate direction, are located within a distance A from each other, the range of each of the antennas is e.g. A/2. In the case herein contemplated, the object 120 is located in its position as shown in FIG. 1, i.e. at the intersection of the antennas 104 and 110, thus within the range of only these two antennas 104 and 110 and therefore only receives the code sequences that are emitted via these two antennas by the CDMA transmitter 118 during the location-finding phase, namely the code sequence 1 and the code sequence 4. The object 120 thereafter stores the identifiers of the code sequences that were received, meaning the identifier 1 and the identifier 4, whereby in this embodiment the location-finding phase has been completed.

During the subsequent read-out phase, the RFID reader 130 is responded by the processor 132 through the execution of the program module, so that the processor reads out the memory content of the object 120, so that in the case contemplated herein, the identifiers 1 and 4 are received by the electronic device 116.

By executing the program module 136 then the allocation table 142 of the memory 140 is responded, in order to read through a lookup operation, the antenna coordinates that are assigned to the identifiers from the allocation table 142, in this case meaning identifier 1 and 4. For the identifier 1 this results in the x position x=1, and for the identifier 4, the y position y=1, whereby at the same time the coordinates and thus the position of the object 120 in the coordinate system that is extended through the antennas 102-112, is given, namely the coordinates x=1 and y=2.

Thereafter, by executing program module 138, the output of the detected position of the object 120 takes place via a user interface, e.g. via the display 144. Correspondingly, this method may be applied for additional objects 120 that are located in the area. They may be read out e.g. via RFID, especially by applying a method to avoid collisions (See "RFID Manual", Klaus Finkenzeller, 5th Edition, 2005, Carl Hanser Publishers, Chapter 7.2)

The components of the electrical device 116 may be realized either in one single physical unit or as spatially distributed system components that are able to communicate with each other, especially also via a network.

FIG. 2 shows a block diagram of an embodiment of the object 122. In a margin area of the object, the antenna 128 is located, which is connected with the contactless interface 124 of the electronic circuit 122. The electronic circuit has a CDMA receiver 146 that implements an allocation instruction 148 through which each of the M code sequences is assigned to its code sequence identifier.

When the CDMA receiver 146 e.g. receives the code sequence 0, the former will be assigned via the allocation instruct ion 148 to its identifier 0. The same is the case with the additional code sequences 1-5. The CDMA receiver 146 is capable of simultaneously receiving all of the code sequences 0-5, meaning that the CDMA receiver 146 receives the summary signal that is derived through the overlapping of the code sequences that are emitted by the antennas 102-112, and then attempts to receive all of these signals with the help of the same code sequences that are known in advance to the CDMA receiver 146.

For those code sequences for which this is accomplished, the allocation to the respective code sequence identifier that then is stored in an electronic memory 150, takes place through a processor 156.

A memory area 152 of the memory 150 then contains the identifiers of all code sequences that were emitted during the location-finding phase by the CDMA transmitter 118 of the electronic device 116 (See FIG. 1). Additionally, the memory 150 may comprise a memory area 154 in which an attribute of the object 120 is stored, such as a value, especially an amount, a number, a letter or a symbol.

Via the contactless interface 124, the RFID reader 130 may read out both the identifiers from the memory area 152 and the attribute from the memory area 154. After deriving the positions of the object 120 from the identifiers, e.g. with the help of the allocation table 142 (See FIG. 1), the position of the object 120 together with the attribute 154 may be issued via the display 144.

Figure 3:
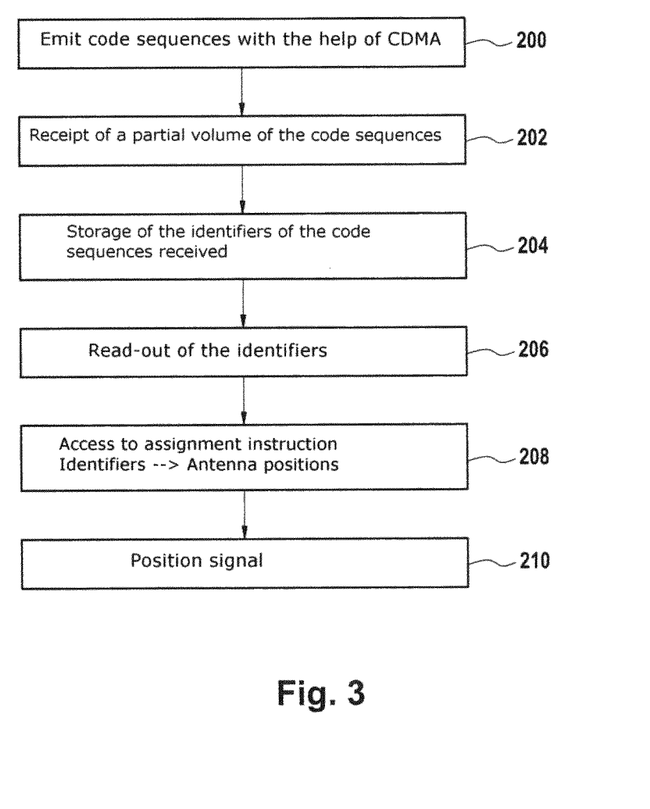

FIG. 3 shows a corresponding flow diagram.

In step 200, all M code sequences are emitted with the help of CDMA via the M antennas. In step 202, the object subsequently receives a partial amount of these code sequences and stores the identifiers of the code sequences that were received in step 204. In step 206, at least the identifiers from the object are read out, and in step 208 with the help of the identifiers, the antenna positions are determined from which the respective code sequences were received, e.g. by accessing the allocation table 142 (See FIG. 1). The resulting position signal is then released in step 210.

Alternatively, the determination of the position may also take place through the object 120 itself. In this case, the allocation table 142 is stored in the memory 150 of the object 120, so that the object itself determines with the help of the identifiers of the code sequences received the coordinates of the spatial position of the object 120. In this case, the position may be read out directly via the contactless interface 124.

Alternatively, the object 120 may be a navigation device. In this case, the position is not read out via the contactless interface, but rather processed locally through a navigation function.

The electronic system according to the above embodiment may also be an automation system with a robot 158 (See FIG. 1). The robot is connected to the electronic device (116) and receives from there the position of the object with its robot steering. The robot steering then correspondingly triggers one of the robot's claws, in order to grasp the object 120.

Figure 4:
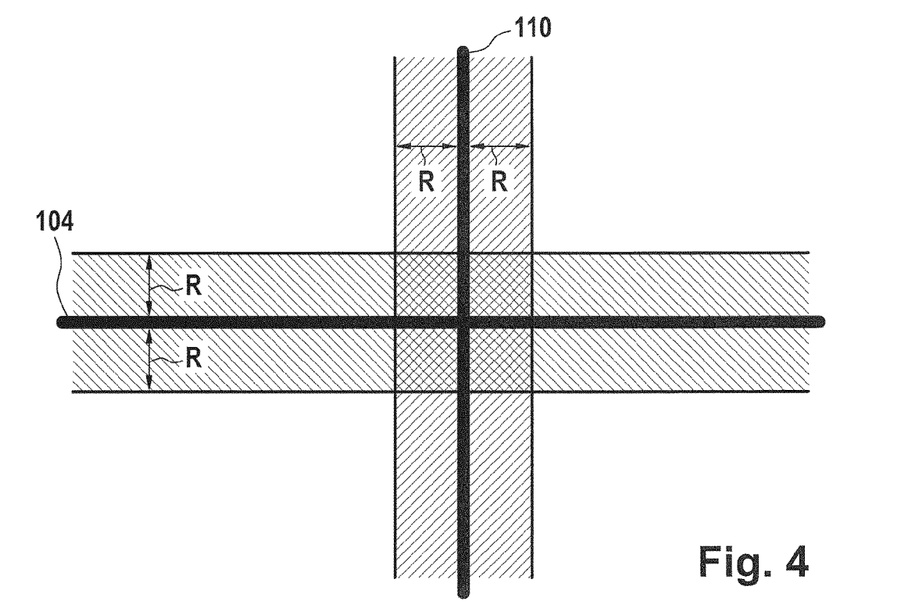

FIG. 4 shows by way of example the antennas 104 and 110 in their intersecting area with the respective ranges R that are depicted hatched. Herein, range R may be significantly smaller than A (See e.g. FIG. 6) so that the position of the object may only be detected when the object is located either close to or on top of one of the antennas.

Figure 5:
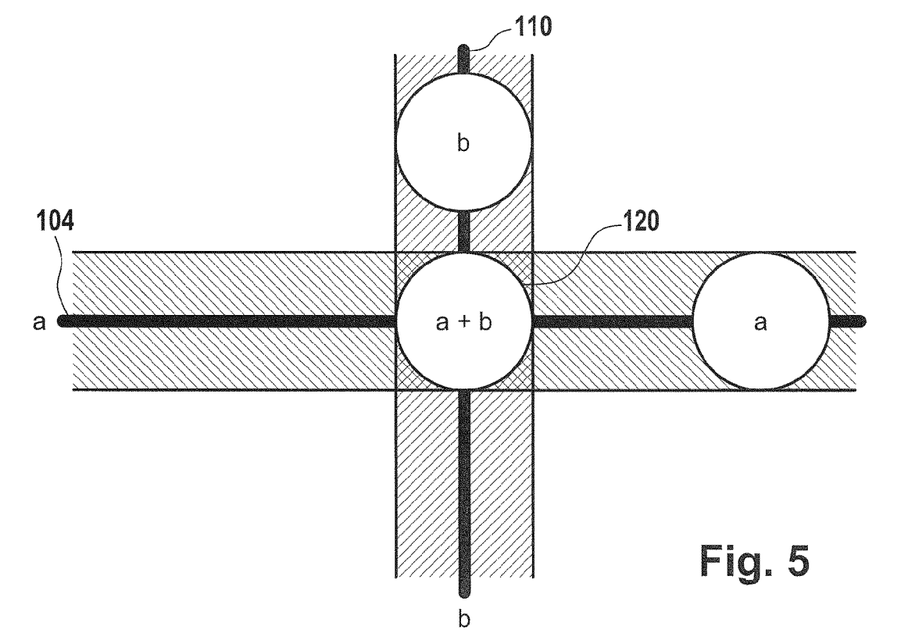

FIG. 5 shows the intersecting area of the antennas 104 and 110 when via the antenna 104 a code sequence with the identifier a and via the antenna 110 a code sequence with the identifier b is sent out. If the object 120 is located in the intersecting area of the antennas 104 and 110, it also receives the identifiers a and b.

Figure 6:
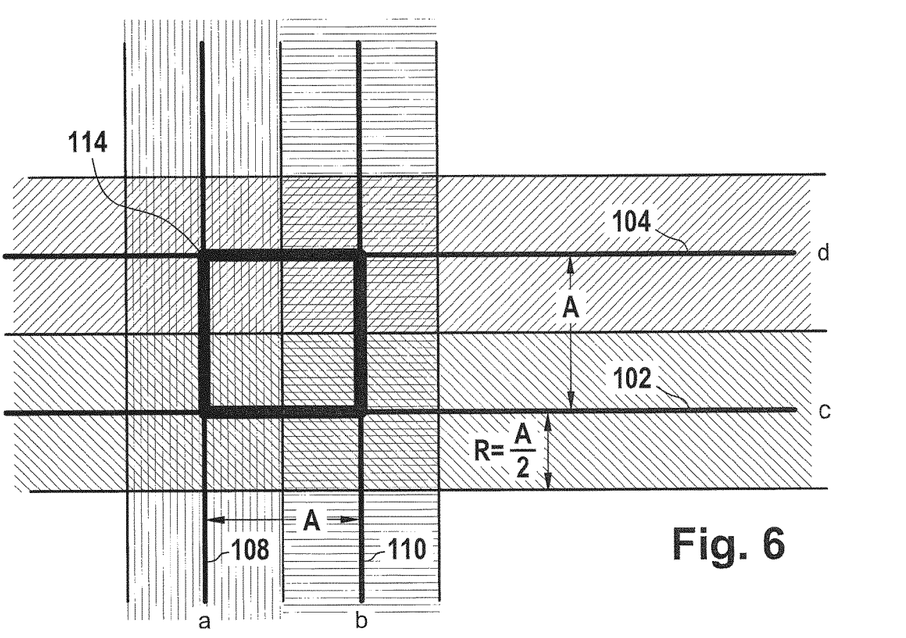
FIG. 6 Four dipole antennas with their expansion ranges

FIG. 6 shows a corresponding depiction for four antennas, such as for example the antennas 108, 110 and 102 and 104, via which the orthogonal code sequences with the identifiers a, b, c and/or d are sent out and that are located in a distance of A from each other, as shown in FIG. 6. The ranges R of the antennas are shown in FIG. 6 through hatching. Here, the ranges are A/2.

Figure 7:
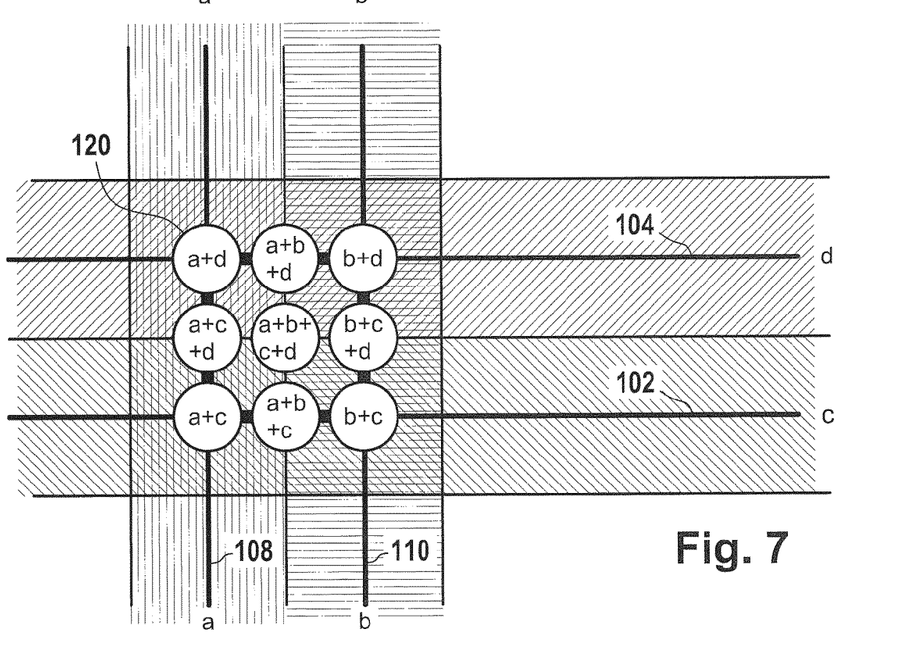
FIG. 7 Nine different positions that may be detected with the help of the four antennas, according to FIG. 5

The possibilities for location detections in the resulting area 114 are depicted in FIG. 7. If the object 120 e.g. is located at the intersection of the antennas 104 and 108, the object 120 receives the code sequences with the identifiers a and d. If the object 120 is located on top of the antenna 104, and between the antennas 108 and 110, it receives, in addition to the code sequence with the identifier d, also the code sequences a and b of the antennas 108 and 110, between which the object 120 is located, since the object 120 is still just within the respective ranges. The area 114 may be located e.g. in a game area 126, such as a roulette table.

If the object 120 is located in the surface center of gravity of the area 114, it is within the range of all the antennas 108, 110, 102 and 104 and, accordingly, receives the code sequences with the identifiers a, b, c and d.

As can be seen from FIG. 7, the object 120 thus receives in each of the nine positions shown a characteristic combination of identifiers from which the position of the object 120 may be derived.

Figure 8:
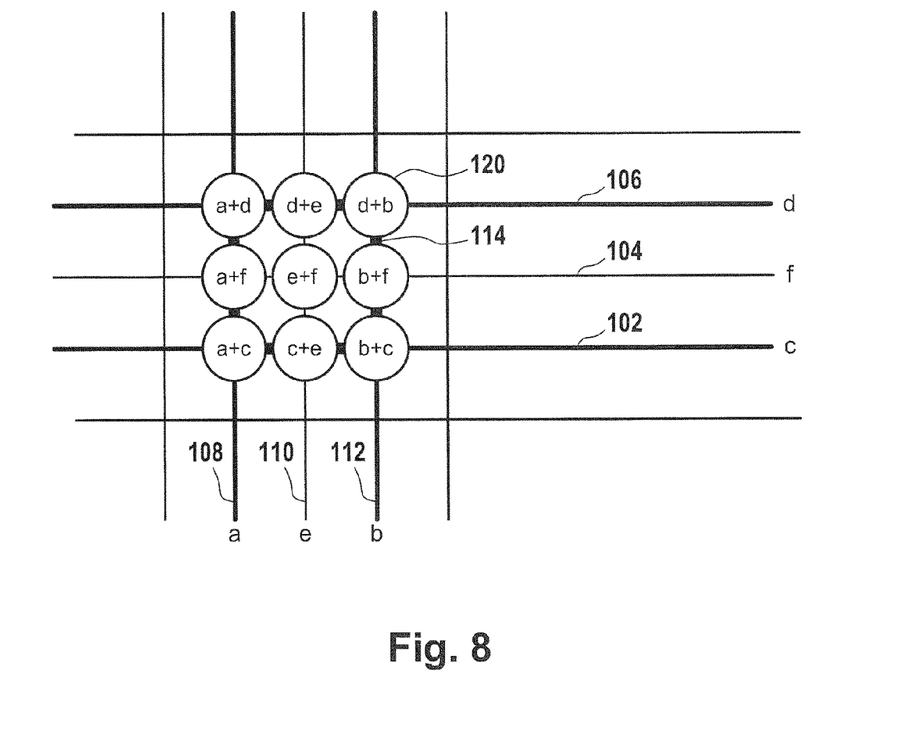
FIG. 8 An embodiment with two additional antennas as a further development of the embodiment according to FIG. 6, in order to increase the exactitude of the position detection.

FIG. 8 shows a further development of the embodiments according to FIG. 7, namely with one additional antenna per coordinate direction. In the herein contemplated embodiment, code sequences with the identifiers 1, e, b, and/or c, f and d, respectively, are sent out via the antennas 108, 110, 112, in addition to 102, 104 and 106. The position-dependent combinations of code sequences that are received by the object 120, are shown in FIG. 8 for the area 114.

Figure 9:
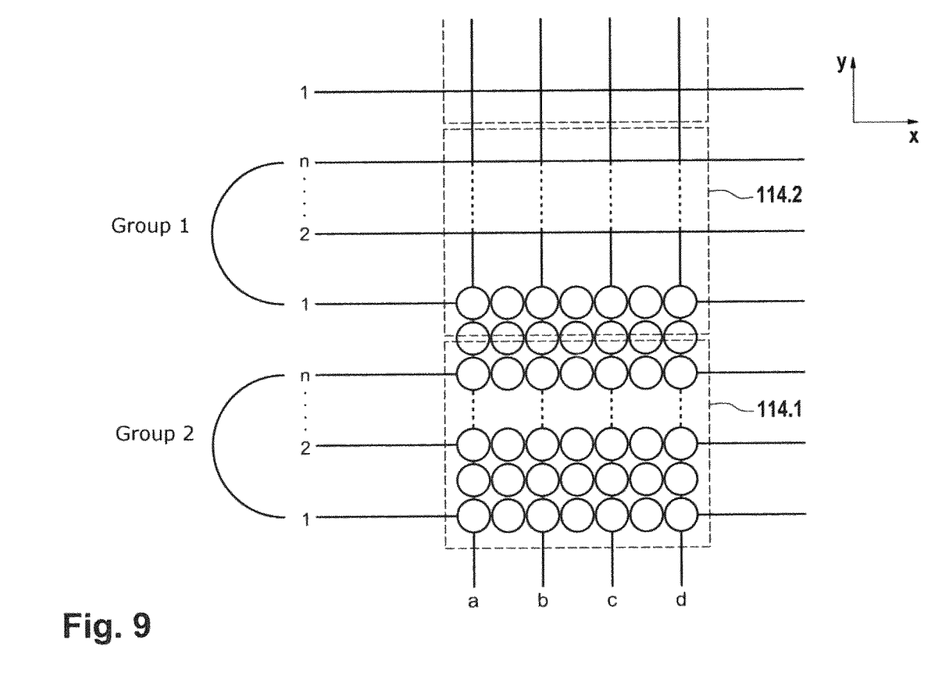
FIG. 9 Several groups of M antennas

FIG. 9 shows an arrangement of the CDMA emitter antennas that are integrated in a number of N groups. Four equidistant parallel antennas through which code sequences with the identifiers a, b, c and/or d are sent out, extend into the direction y. In the direction x, per group a number of n equidistant parallel antennas extends, through which code sequences with the identifiers 1, 2, . . . n are sent out.

This allocation of code sequences to antennas is repeated for the x directional antennas per group in accordance with a prescribed spatial pattern, as depicted in FIG. 9. Despite this repetition of code sequences, an unequivocal position determination is possible, since the ranges of the antennas are limited. Also with respect to adjacent antennas of two groups that are arranged next to each other that extend in the x direction, here of the antenna, that serves to transmit the code sequence n and the antenna that serves to transmit the code sequence 1, an unequivocal position determination is possible since in the individual groups always the same sequence of 1 though n with respect to the spatial allocation to the antennas of a group is chosen.

During the location-finding phase, for example, the N groups are triggered sequentially in a pre-determined, fixed order, in order to send out the respective code sequences.

Figure 10:
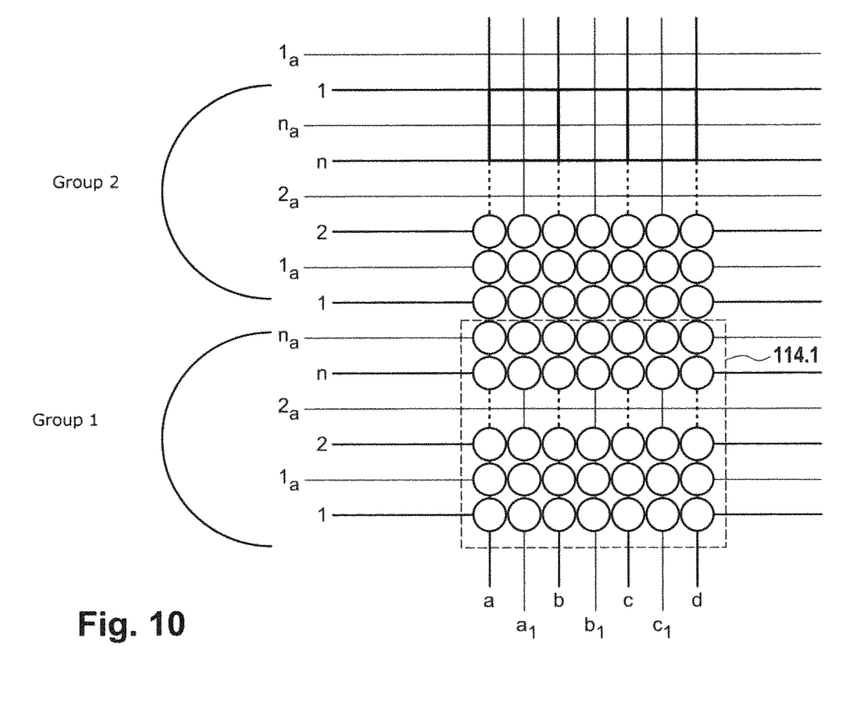
FIG. 10 A further development of the embodiment according to FIG. 8 with additional antennas in order to increase the exactitude.

FIG. 10 shows a further development of the embodiment according to FIG. 9, in which the number of the antennas in the x and the y direction has been increased in order to enlarge the areas 114 and/or to improve the precision or the position detection in both the x and the y direction.

Figure 11:
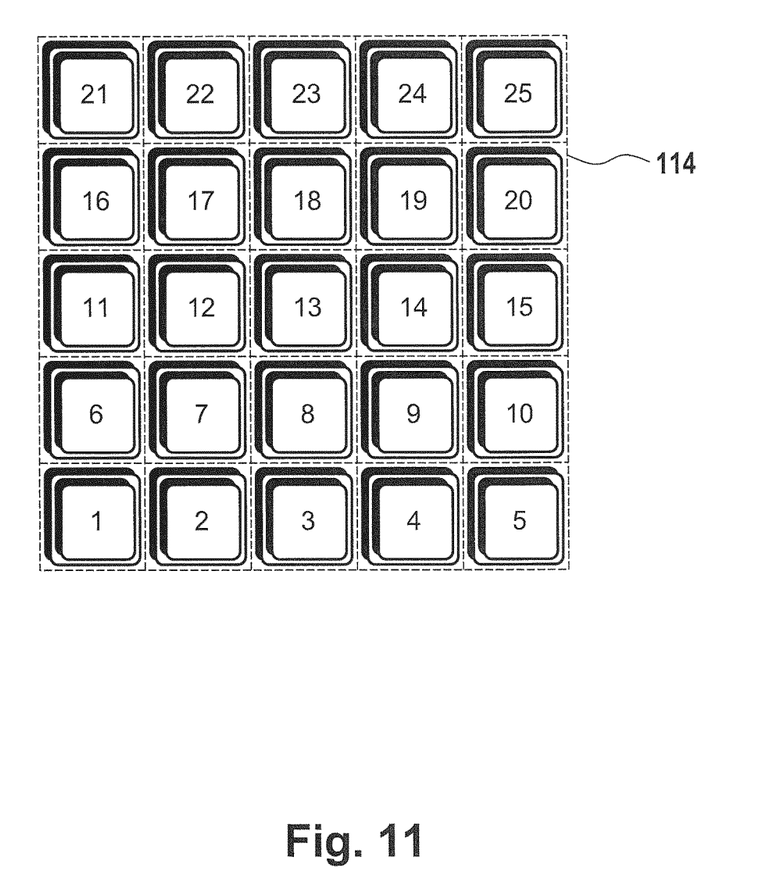
FIG. 11 An embodiment with patch antennas, wherein each patch antenna emits its own code.

FIG. 11 shows another embodiment in which the various antennas that serve to emit the code sequences are patch antennas. Via each of the patch antennas, a certain code sequence with an assigned identifier of 1-25 is emitted. A result from the overlapping of the emitted code sequences is different positioning possibilities.

The patch antennas may in turn be integrated into groups, whereby the ranges of the signal dissemination must be taken into account with respect to the repetition distances of the codes, in order to avoid the overlapping of two emissions of the same code by two antennas.

In order to further enhance the precision, panel antennas on whose surface several patch antennas are placed, may be used instead of patch antennas. The choice of antennas depends on the frequency range (the side length of a patch antenna is typically defined by $\lambda/4$, wherein $\lambda$ is the wavelength), the distances, in addition to the precision requirements.

Figure 12:
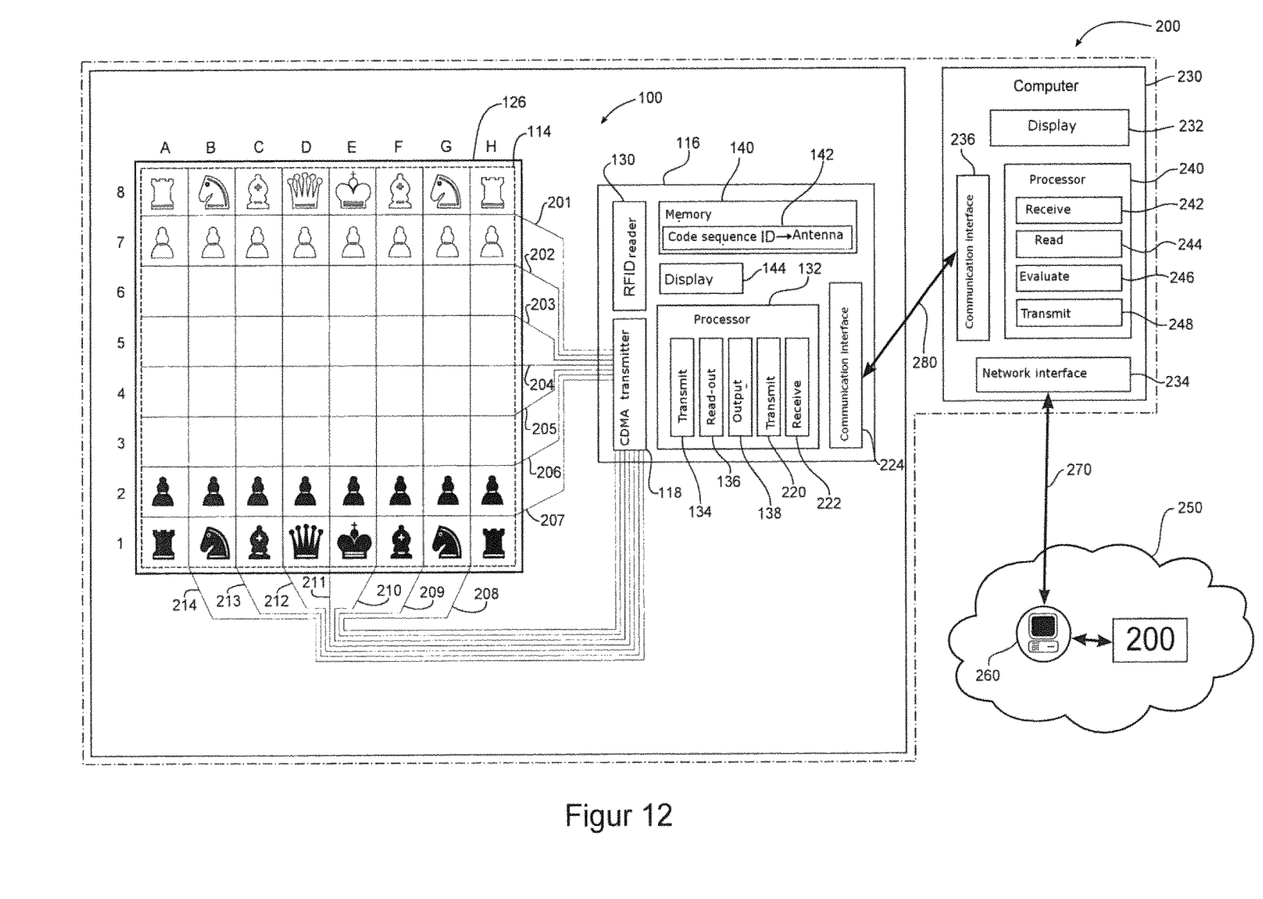
FIG. 12 An embodiment with a board game that is linked to the board game of another player via a computer.

FIG. 12 shows another embodiment of the invention, in which a raster from the antennas 201-214 covers the playing area of a board game, in this example a chess game. As already described, the electrical system 100 comprises a raster from the antennas 201-214, in which a CDMA code sequence has been assigned to each antenna. The antennas 201-214 are arranged such that the area 114 covered by them, extends above a game area 126 and/or, in this case, a chess board. A multitude of game pieces is located on the game field, in which each game piece contains an electronic circuit 122 with a matching antenna 128 (not depicted). The antennas 201-214 are connected to a CDMA transmitter 118 that is located within an electronic device 116. The electronic device furthermore comprises the already described components RFID reader 130, display 144, memory 140, in which the allocation of the code sequence to the antenna 142 is contained, in addition to a processor 132 that contains program modules for the emission 134 of signals via the antennas 201-214, for the reading-out 136 of the information of the electronic circuits 122, in addition to output 138 of the spatial position of the objects in the control area 144 of the antennas 201-214. As compared to the embodiments in FIG. 1, the electronic device 116 is expanded by a communication interface 224. Additionally, the processor 132 is expanded by program modules for the transmittal 220 of data via the communication interface 224, and the receipt 222 of data via the communication interface 224. The electrical system 100 is part of a total system 200. The total system 200 additionally comprises a computer 230 that comprises, like the electronic device 116, a communication interface 236. Moreover, the computer 230 comprises a display 232, a network interface 234, in addition to a processor that contains program modules for the reception 242 or the transmittal 248 of data via the communication interface 236 or the network interface 234. The processor is furthermore equipped with program modules that enable it to read messages that were received via the interfaces 244, in addition to evaluating their content 246. A communication connection 280 exists between the communication interface 224 of the electrical device 116 and the communication interface 236 of the computer 230. Through its network interface 234, the computer 200 is able to establish a connection 270 with a server computer 260 that is located within a network 250. The server, in turn, is connected to a further system 200 in accordance with the above description.

The embodiment that is described here aims to execute a board game with a number of players via a network connection. Below, the course of a game is explained by using the example of a chess game:

Two players participate in a game of chess. They are called Player 1 and Player 2 in the following explanation. Player 1 is the player who has the chess board depicted in FIG. 12 in front of him.

Before the start of the game, the processor 132 initiates the emission 134 of the code sequences via the respective antennas 201-214 through the CDMA emitter 118. Subsequently, via the RFID reader 130, the ID 152 that is received by the electronic circuits 122 in the game pieces and the matching attribute 154 that characterizes the game piece regarding type and allocation to a player, is read out 136.

From the thus derived data, the current position of the game pieces on the game field may be reconstructed, as already described. The processor 132 may e.g. check whether all game pieces are in the correct position so that the game may begin. Via the display 144, the processor 132 may accordingly indicate that the game may begin or, alternatively, that the positions of game pieces are incorrect. Moreover, the processor may store the last recorded game score in the memory 140.

The electronic device 116 is connected via its communication interface 224 with a computer 230 via the latter's communication interface 236. Hereby, the connection may be established via e.g. USB, Bluetooth, optical connections, FireWire, Wi-Fi or similar. The processor 132 now sends 220 a message to the computer 230 that contains information from which the current game score on the fame field of Player 1 may be reconstructed. The processor 240 receives 242 this message and may transmit it now either via the network interface 234 through a communication connection 270 to a server 260 and/or to the system 200 of the second player, or it may read 244 and evaluate 246 the content of the message. Hereby, the server 260 and the system 200 are preferably located in a network 250, such as the Internet. The checking of the correct lineup and the release of the game may e.g. also be carried out by the computer.

Now, for example, Player 1 (black) opens the game, by moving a pawn from position C2 to position C3. Subsequently, Player 1 may manually confirm that he has completed his move. Alternatively, the surface of the game area 126 may have a tactile design, so that at the moment when a game piece is deposited onto the game field 126, the move is counted as completed. Now the actual game situation according to the above description is recorded by the electronic device 116. By comparing it to the last game situation that was stored in the memory 140, the processor 132 may e.g. reconstruct which game piece was moved in what manner and may transmit the corresponding information to the system 200 of Player 2.

Hereby it may be checked, either through an electronic device 116 of one of the players, through a computer 230 of one of the players or through the server computer 260, whether the move that was completed was in conformity with the rules of the game. Accordingly, the game may either continue or the players are informed by a message on one of the displays 144 or 232 that a game has been interrupted on account of a rule violation.

If the move by Player 1 conformed to the rules and was transmitted to the system 200 of Player 2, the new game situation is displayed to Player 2 through the system 200. Hereby it is possible, that on the game field itself an animation is shown that demonstrates the move completed by Player 1. Equally, display 144 or 232 may indicate which game piece was moved. It is also possible that the opponent's game pieces on the player's game field are not physical objects, but rather figures that are shown on a display and/or holograms of game pieces. Thereby, Player 2 does not have to reconstruct the move by Player 1; instead, the new game situation is independently depicted by the system 200.

As soon as Player 2 has reconstructed on the playing field 126 the game situation that exists on the playing field 126 of Player 1, Player 2 may complete a move that is recorded, evaluated and transmitted to the system 200 of Player 1, in accordance with the above explanation.

All evaluations of position data of the game pieces that have been derived, e.g. checking for rule violations, determining point counts and the like, may be carried out either in the electrical systems 100, the computer 230 or one of several servers 260 in the network 250.

The communication between the systems 200 may take place via a social network. If, for example, a first player wishes to play a game of chess, but does not have a partner, he may log into an appropriately designed application program within a social network and inform it of the fact that he is looking for a gaming partner. As soon as a second player also logs in and indicates that he, too, is looking for a gaming partner, it may be suggested to the first and the second player, to open a game of chess. If both parties agree, a communication connection is established between the board games of the two players, e.g. via a server computer 260, and the game is executed in accordance with the above description.

LIST OF TERMINOLOGY

100 electrical system
102 antenna
104 antenna
106 antenna
108 antenna
110 antenna
112 antenna
114 area
116 electronic device
118 CDMA transmitter
120 object
122 electronic circuit
124 contactless interface
126 playing field
128 antenna
130 RFID reader
132 processor
134 program module
136 program module
138 program module
140 electronic memory
142 allocation table
144 display
146 CDMA receiver
148 allocation instruction
150 electronic memory
152 memory area
154 memory area
156 processor
158 robot
200 system
201 antenna
202 antenna
203 antenna
204 antenna
205 antenna
206 antenna
207 antenna
208 antenna
209 antenna
210 antenna
211 antenna
212 antenna
213 antenna
214 antenna
220 program module
222 program module
224 communication interface
230 computer
232 display
234 network interface
236 communication interface
240 processor
242 program module
244 program module
246 program module
248 program module
250 network
260 server computer
270 communication connection
280 communication connection

What is claimed is:

1. A roulette table, comprising an electronic system having at least one electronic circuit, a number of M antennas, a Code Division Multiple Access (CDMA) transmitter for sending a number of M orthogonal code sequences via the antennas, and a contactless communication interface for receiving the position from an electronic memory of the electronic circuit, in which the antennas are arranged below stake fields of the roulette table, and having chips, in which each chip is equipped with an electronic circuit, and in which the electronic circuit comprises the following:

a CDMA receiver to receive a number of M orthogonal code sequences;

an electronic memory, in which an allocation instruction is stored, wherein through the allocation instruction each code sequence is assigned to one of the antennas, wherein the allocation instruction contains information regarding the spatial location of the respective antenna;

a processor for accessing the electronic memory to determine the position of the electronic circuit relative to the antennas by determining, with help of the code sequences received from the CDMA receiver, information regarding the spatial locations of those antennas by which the code sequences were received, and by deriving from the detected spatial locations of the antennas the position of the electronic circuit and producing a position signal therefrom; and a contactless communication interface for transmitting the position signal.

2. The roulette table according to claim 1, wherein two adjacent antennas have the same distance A from each other, and the range of the CDMA transmitter is preferably at least A/2.

3. The roulette table according to claim 1, comprising several groups of the M antennas, wherein in each of the groups the allocation of one of the orthogonal code sequences to one of the M antennas is repeated, and wherein the affiliation of each of the antennas to one of the groups is stored for determining the position.

4. A roulette table according to claim 1, wherein the CDMA transmitter is designed such that the transmission of the code sequences occurs in the same frequency band, and subsequently the identifiers and/or the position of the object are transmitted to the contactless communication interface.

5. A roulette table according to claim 1, wherein the antennas are designed as dipole antennas, patch antennas, or panel antennas.

6. A board game, such as SCRABBLE, chess, or Nine Men's Morris, comprising a game board and game pieces, and comprising an electronic system having at least one electronic circuit, a number of M antennas, a Code Division Multiple Access (CDMA) transmitter for sending a number of M orthogonal code sequences via the antennas, and a contactless communication interface for receiving the position from an electronic memory of the electronic circuit, in which the antennas are arranged in or on the board game, and each game piece is equipped with an electronic circuit, and in which the electronic circuit comprises the following:

a CDMA receiver to receive a number of M orthogonal code sequences;

an electronic memory, in which an allocation instruction is stored, wherein through the allocation instruction each code sequence is assigned to one of the antennas, wherein the allocation contains information regarding the spatial location of the respective antenna;

a processor for accessing the electronic memory in order to determine position of the electronic circuit relative to the antennas by determining, with the help of the code sequences received from the CDMA receiver, the information regarding the spatial locations of those antennas by which the code sequences were received, and by deriving from the detected spatial locations of the antennas the position of the electronic circuit and producing a position signal therefrom, and a contactless communication interface for transmitting the position signal.

* * * * *